United States Patent
Schaff et al.

(10) Patent No.: US 6,445,521 B1
(45) Date of Patent: Sep. 3, 2002

(54) WRITE CURRENT OPTIMIZATION IN A DISC DRIVE SYSTEM

(75) Inventors: Michael D. Schaff, Longmont; Bernard Alan Russick, Niwot, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/302,353

(22) Filed: Apr. 30, 1999

Related U.S. Application Data
(60) Provisional application No. 60/101,735, filed on Sep. 24, 1998.

(51) Int. Cl.[7] .............................. G11B 5/09; G11B 27/36
(52) U.S. Cl. .............................. 360/31; 360/53; 360/46
(58) Field of Search .............................. 360/46, 53, 31, 360/25, 67

(56) References Cited

U.S. PATENT DOCUMENTS

| | | | | |
|---|---|---|---|---|
| 5,600,500 A | * | 2/1997 | Madsen et al. | 360/46 |
| 5,687,036 A | * | 11/1997 | Kassab | 360/53 |
| 5,910,861 A | | 6/1999 | Ahn | 360/46 |
| 5,995,305 A | * | 11/1999 | McNeil et al. | 360/31 |
| 6,252,731 B1 | * | 6/2001 | Sloan et al. | 360/31 |

* cited by examiner

*Primary Examiner*—Regina N. Holder
(74) *Attorney, Agent, or Firm*—Merchant & Gould P.C.

(57) ABSTRACT

A method and apparatus for selecting an optimized write current for a write head to improve read performance from a track-of-interest on a storage disc. Read error rates are detected from a test pattern written to the track-of-interest using a plurality of test write currents. The read error rates are detected over a range of read positions offset from the track-of-interest. Off-track read capability (OTC) values corresponding to each test write current are determined based on the read error rates that satisfy an acceptable error rate criterion. The test write current that corresponds to the maximum OTC value is selected as the optimized write current. An optimized write current value corresponding to the optimized write current and a head value corresponding to the write head are associatively stored in a storage unit, and the values are read from the storage unit and the optimized write current is supplied to the write head in accordance to the optimized write current value.

17 Claims, 11 Drawing Sheets

WRITE CURRENT OPTIMIZATION IN A DISC DRIVE SYSTEM

The present application claims the benefit of U.S. Provisional Application No. 60/101,735 entitled "METHOD OF WRITE CURRENT OPTIMIZATION USING 747 CURVES", filed Sep. 24, 1998.

FIELD OF THE INVENTION

The present invention relates generally to the field of disc drive storage devices, and more particularly, but not by way of limitation, to optimizing write current to minimize encroachment of magnetic tracks and to maximize off-track read capability (OTC).

BACKGROUND OF THE INVENTION

Modern hard disc drives comprise one or more rigid disks that are coated with a magnetizable medium and mounted on the hub of a spindle motor for rotation at a constant high speed. Information is written on each disc in a plurality of concentric tracks by a transducer assembly mounted on an actuator arm. Typically, the transducer assembly is suspended over the disc from the actuator arm in a slider assembly, which includes air bearing surfaces designed to interact with a thin layer of moving air generated by the rotation of the disks. Transducer assemblies are said to "fly" over the disc surface as the disc rotates. To access tracks on the disc, the actuator arm moves in an arc across the disc. The physical distance between the nominal centers of two adjacent tracks is referred to as the "track pitch". The track pitch and linear track density define the storage capacity of the disc.

A transducer assembly typically includes a read head and a write head. As a write head writes data to the magnetic disc, it creates a track region called a "write track". As a read head reads data from the magnetic disc, it travels along the write track detecting the recorded signal from a region called a "read track". The write head is wider than the read head, so that the read head generally follows within the bounds of the write track on the magnetic disc. Ideally, the center of the read track coincides with the center of the write track, but various mechanical limitations invariably cause misalignment (or off-tracking) between the read and write tracks.

Furthermore, characteristics such as the size of the write head, the coercivity of the storage media, the media thickness and the head fly height can affect the width of the write track. Moreover, these parameters can vary among magnetic disks and among transducer assemblies. Accordingly, to maintain acceptable operational tolerances, a write track is typically designed to be narrower than the overall track pitch so as not to encroach one write track into an adjacent write track. The difference in width between the write track and the track pitch, however, introduces wasted space within each track. A need exists to reduce this space without introducing an additional source of errors caused by encroaching adjacent tracks.

SUMMARY OF THE INVENTION

The present invention provides a method and apparatus for optimizing write current in a track-of-interest on a storage disc of a disc drive system.

In accordance with a preferred embodiment, a method for selecting an optimized write current for a write head to improve read performance from a track-of-interest on a storage disc is provided, including measuring a plurality of error rates associated with a plurality of test write currents. One of the test write currents is chosen based on the error rates to provide the optimized write current, thereby improving the read performance from the track-of-interest.

In accordance with a preferred embodiment, an apparatus for selecting an optimized write current for a write head to improve read performance from a track-of interest on a storage disc is also provided. The apparatus comprises an off-track read capability processor for measuring off-track read capabilities associated with a plurality of test write currents supplied to the write head. An optimized write current storage unit stores an optimized write current value corresponding to the optimized write current and a head value representing the write head. The optimized write current value, which represents the test write current that corresponds to a maximum of the off-track read capabilities, is stored to the optimized write current storage unit by an optimized write current processor. A disk drive system including the apparatus is also provided.

In accordance with a preferred embodiment, a disc drive system for selecting an optimized write current to improve read performance from a track-of-interest on a storage disc is provided. The disk drive system includes a write head for writing data to the track-of-interest on the storage disc and means for selecting the optimized write current.

These and various other features as well as advantages which characterize the present invention will be apparent from a reading of the following detailed description and a review of the associated drawings.

DETAILED DESCRIPTION

Figure 1:
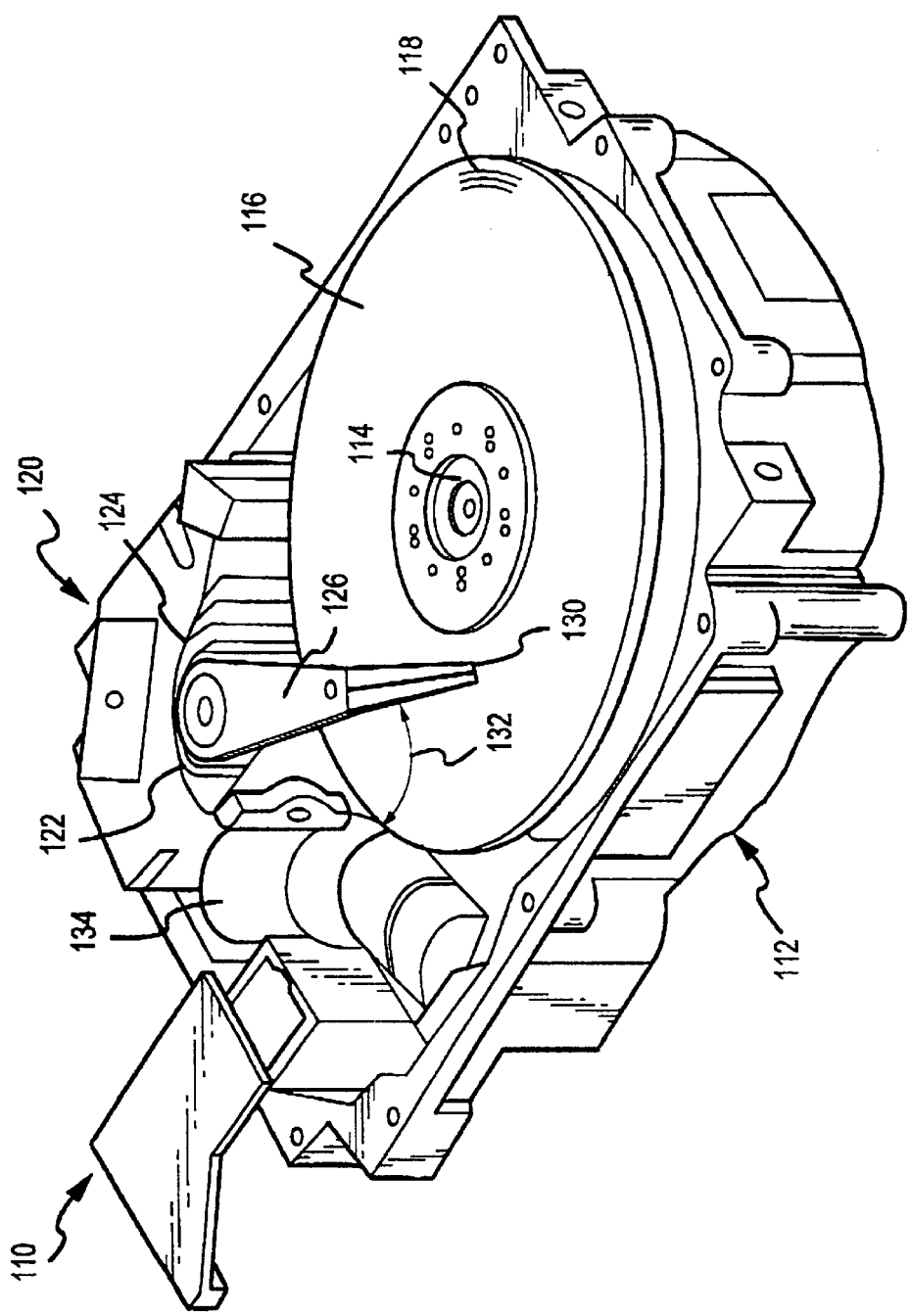
FIG. 1 is a perspective view of a disc drive in which the present invention is particularly useful.

FIG. 1 is a perspective view of a disc drive in which the present invention is particularly useful. The disc drive 110 includes a housing base 112 and a top cover (not shown), which cooperatively engage to form a sealed housing that serves to maintain the clean air environment inside the disc drive. A plurality of disks 116 is mounted for rotation on a spindle motor hub 114. A transducer head assembly 130 is mounted via actuator arm 126 to an actuator body 122. The actuator body 122 is adapted for pivotal motion about a pivot shaft 124 under control of a voice coil motor (VCM), shown generally at 120. The voice coil motor 120 is driven by electronic circuitry (not shown in FIG. 1) to controllably move the heads 130 to any desired one of a plurality of concentric circular tracks 118 on the disc 116 along arcuate path 132. Signals used to control the VCM 120, as well as signals to and from the heads 130, are passed via a flex circuit 134.

Figure 2:
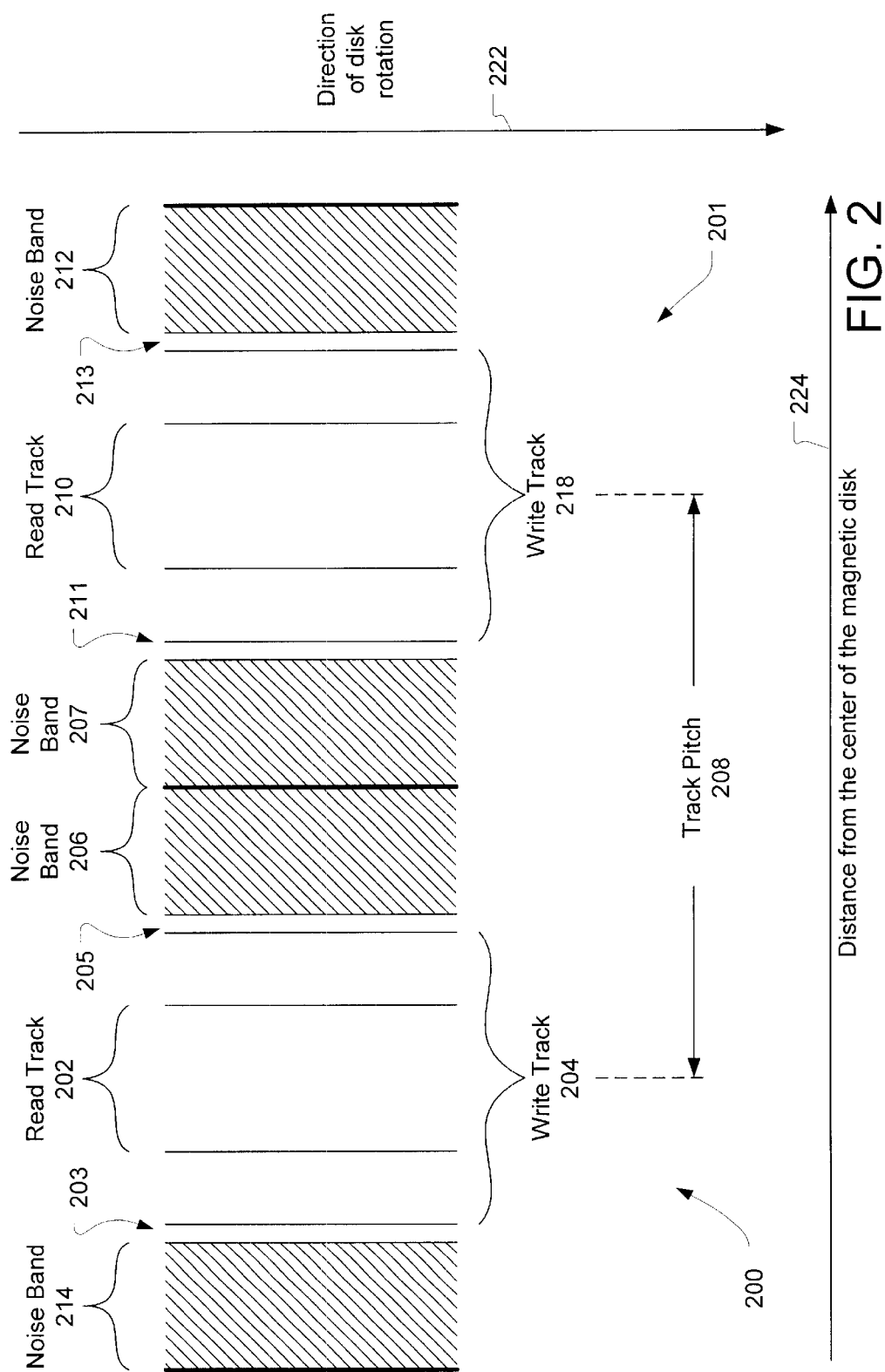
FIG. 2 illustrates two adjacent tracks of a disc drive in an embodiment of the present invention.

FIG. 2 illustrates two concentric tracks of a disc drive in an embodiment of the present invention. A track 200 and a track 201 follow concentric circles around the center of a magnetic disc. The nominal centers of the tracks are separated by a fixed track pitch 208. Consequently, all tracks on a magnetic disc have substantially the same track width. To read or write to the track 200, an actuator arms swings to align a transducer head with the track 200. Alternatively, to read or write the track 201, the actuator arm swings to align the transducer head with the track 201. Arrow 222 represents the direction of disc rotation. Arrow 224 represents the distance from the center of the disc.

A write track 204 represents a region of the track 200 in which a transducer head records a pattern of data to the magnetic disc. Successive bits are recorded along the write track 204 in the direction of disc rotation. On either side of the write track 204, erase bands 203 and 205, which tend to erase data instead of writing data, are caused by the outside edges of the magnetic write field. Erase bands are part of the normal writing process and are taken into consideration in the design of disc drives. Erase bands combine with the effective writing field (e.g., as represented by the write track 204) to make up the magnetic write width. On the outside edges of track 200 are noise bands 214 and 206, which represent regions of the track 200 in which, during normal operation, previously written data that is no longer valid remains recorded. During a certification process, the noise bands are simulated by writing noise-like data to these areas, as discussed below.

The magnetic write width within track 200 is partially controlled by the physical size of the writing element (i.e., the write head), which produces a magnetic write field when a write current passes through it. The physical size of the writing element is controlled within a given set of manufacturing tolerances. Other parameters, some of which are temperature sensitive, can also impact the magnetic write width, including without limitation media coercivity, media thickness and head flying height. The magnitude of the write current also affects the magnetic write width, which widens with increased current. Consequently, increases in the write current cause increases in the width of the write track 204.

Figure 3:
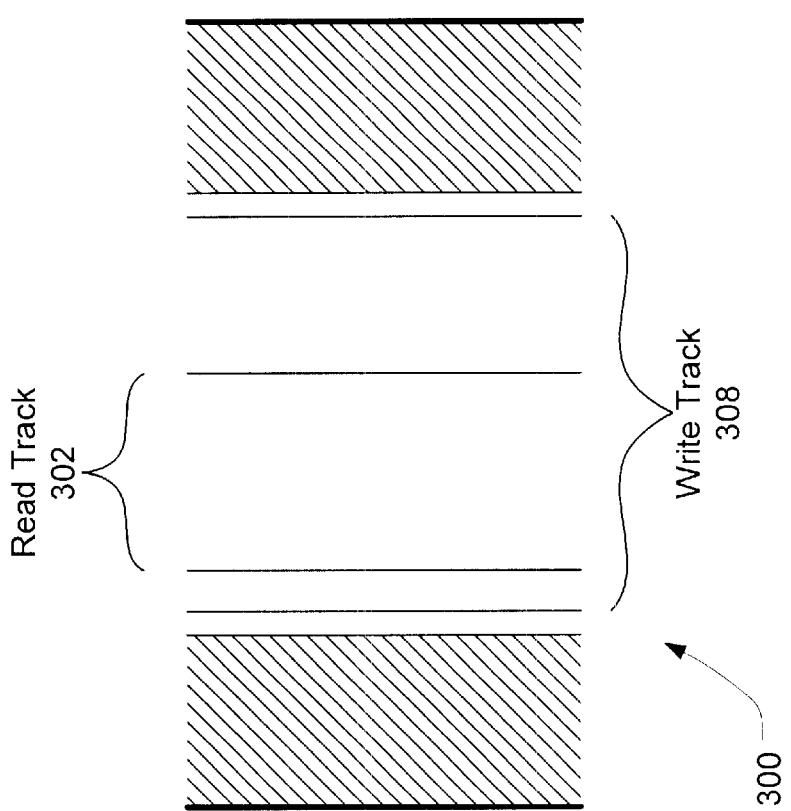
FIG. 3 illustrates a track of a disc drive having misaligned read and write tracks.
Figure 4:
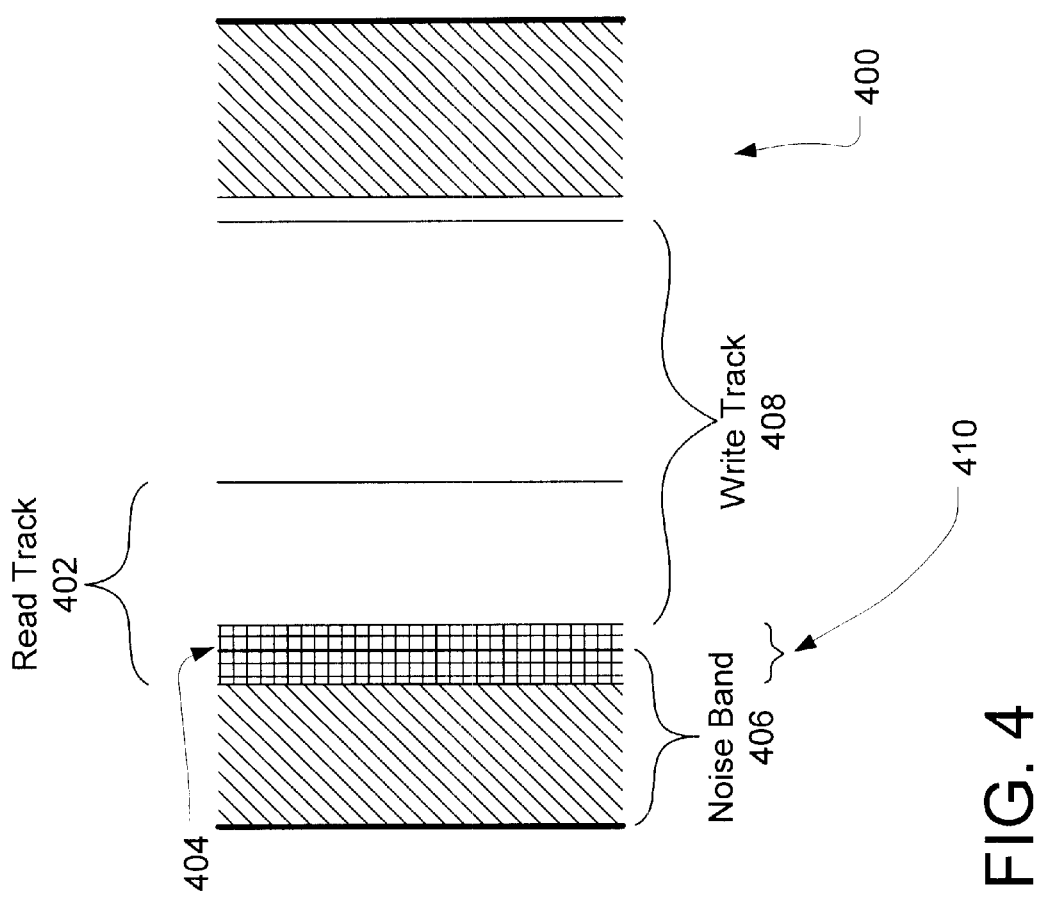
FIG. 4 depicts a track of a disc drive having misaligned read and write tracks, where the read track overlaps an erase band and a portion of a noise band.

Unlike write tracks, noise bands, or erase bands, read tracks do not strictly correspond to magnetic configurations recorded on the disc. A read track 202 represents a region of the track 200 from which a transducer head reads data from the magnetic disc and is defined by the flight of a read head over a track. During normal operation, a read head is required to read data from a track-of-interest within an acceptable error rate, even if the read track is not positioned at the center of the write track. Preferably, a read track width is smaller than a write track width to allow for misalignment of the write track and the path of the read head (i.e., the read track). For example, as shown in FIG. 3, the read track 302 has drifted from the center of the write track 308 (i.e., the read transducer head is offset relative to the center of the write track). Nevertheless, the read transducer head is likely to accurately read the data in the track 300 because the entire width of the read track 302 is reading valid data (i.e., that data in the write track 308). In FIG. 4, the read track 402 has drifted to overlap with an erase band 404 and a portion of a noise band 406 (see overlap region 410). Depending on the error tolerance of the disc drive system, a transducer head is less likely to accurately read data from the track 400 because a substantial portion of the read track 402 is reading invalid data. Accordingly, increasing the width of the write track can increase the accuracy of the disc drive by accommodating an increased amount of offset by a read head. FIG. 2 also shows an adjacent track 201 having a write track 218, a read track 210, noise tracks 207 and 212, and erase bands 211 and 213.

Figure 5:
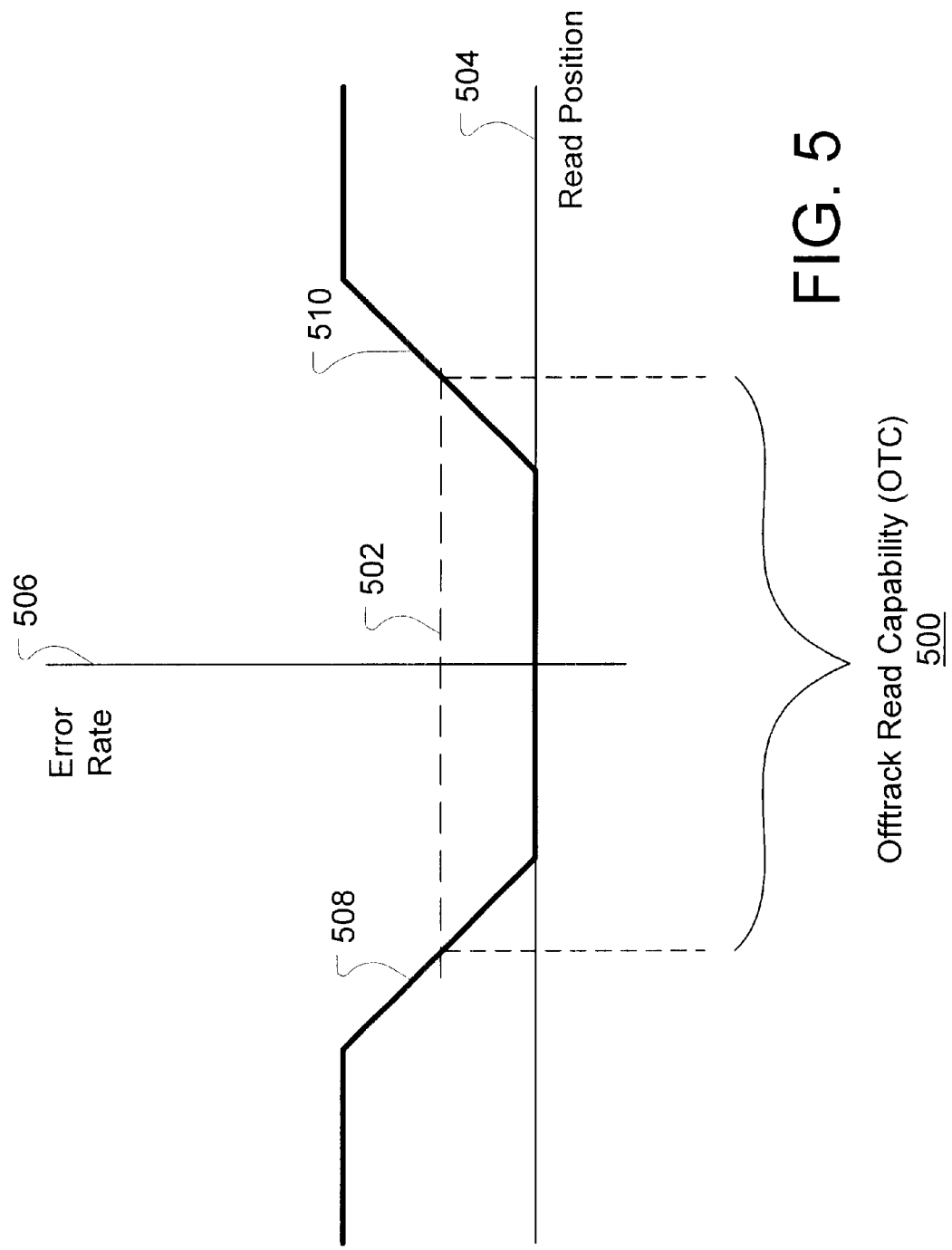
FIG. 5 depicts a graph illustrating off-track read capability.

FIG. 5 depicts a graph illustrating the off-track read capability (OTC) 500, which characterizes the amount of offset that can be tolerated (i.e., maintaining an error rate at or below the acceptable error rate threshold 502) in a track. Typically, OTC measurements are made across a distribution of track pitches using a fixed write current to generate what is known as a "747 curve". In an embodiment of the present invention, however, OTC measurements for each head/disc combination are taken for a fixed track pitch across a distribution of test write currents. Responsive to these OTC measurements, the write current corresponding to the maximum OTC value is selected for each head/disc combination in the disc drive system. In this manner, the write track width for each head/disc combination can be individually optimized to compensate for variations in magnetic disc coercivity, disc thickness, head size, and head flying height. In an alternative embodiment, such optimization can be performed for each head/disc combination on a track-by-track basis, such that the disc drive system could optimize the write current for each track.

In FIG. 5, the x-axis 504 represents the read position (i.e., the amount of offset between the center of a write track and the center of a read track) from which the read operation is performed. Read positions on the x-axis 504 to the left of the y-axis 506 represent negative offsets (i.e., where the center of the read track is closer to the magnetic disc center than the center of the write track). The y-axis 506 represents the detected error rate (e.g., the number of read errors detected over a portion of the track). In a preferred embodiment, read operations are performed over 80% of a circumference of a track for each offset position.

The sloping portions 508 and 510 of the graph represent error rate measurements in which a portion of the read track overlaps one or more erase bands and possibly a portion of one or more noise bands (see e.g., FIG. 4). Such an offset is characterized by more errors than those found near the nominal center of the write track. For example, if a write track includes all "zeros", it is more likely that an error will occur (i.e., a "one" is read) when the read head reads invalid data from an erase band or from a noise band. Accordingly, the sloping portions 508 and 510 represent increased error rates for offset positions where the read track encroaches the boundary of a write track.

In a preferred embodiment of the present invention, the error rate measurements are taken at thirty-two offset positions across the track, with a range spanning from negative to positive offsets, including a zero offset. For example, an offset range from −30 microinches to +30 microinches is used for a 27.2 gigabyte disc drive. The OTC value for each test write current is defined by a number of consecutive error rate measurements across the x-axis 504 having an acceptable error rate. For each head/disc combination, the test write current that corresponds to the maximum OTC value is selected and associated with the corresponding head. Preferably, a value representing the selected (i.e., optimized) write current is stored in persistent storage in the disc drive system, so that after power-up during normal operation, the write current value is read from the persistent storage and the write current source (i.e., a preamp) is set to supply the optimized current to the write head.

Figure 6:
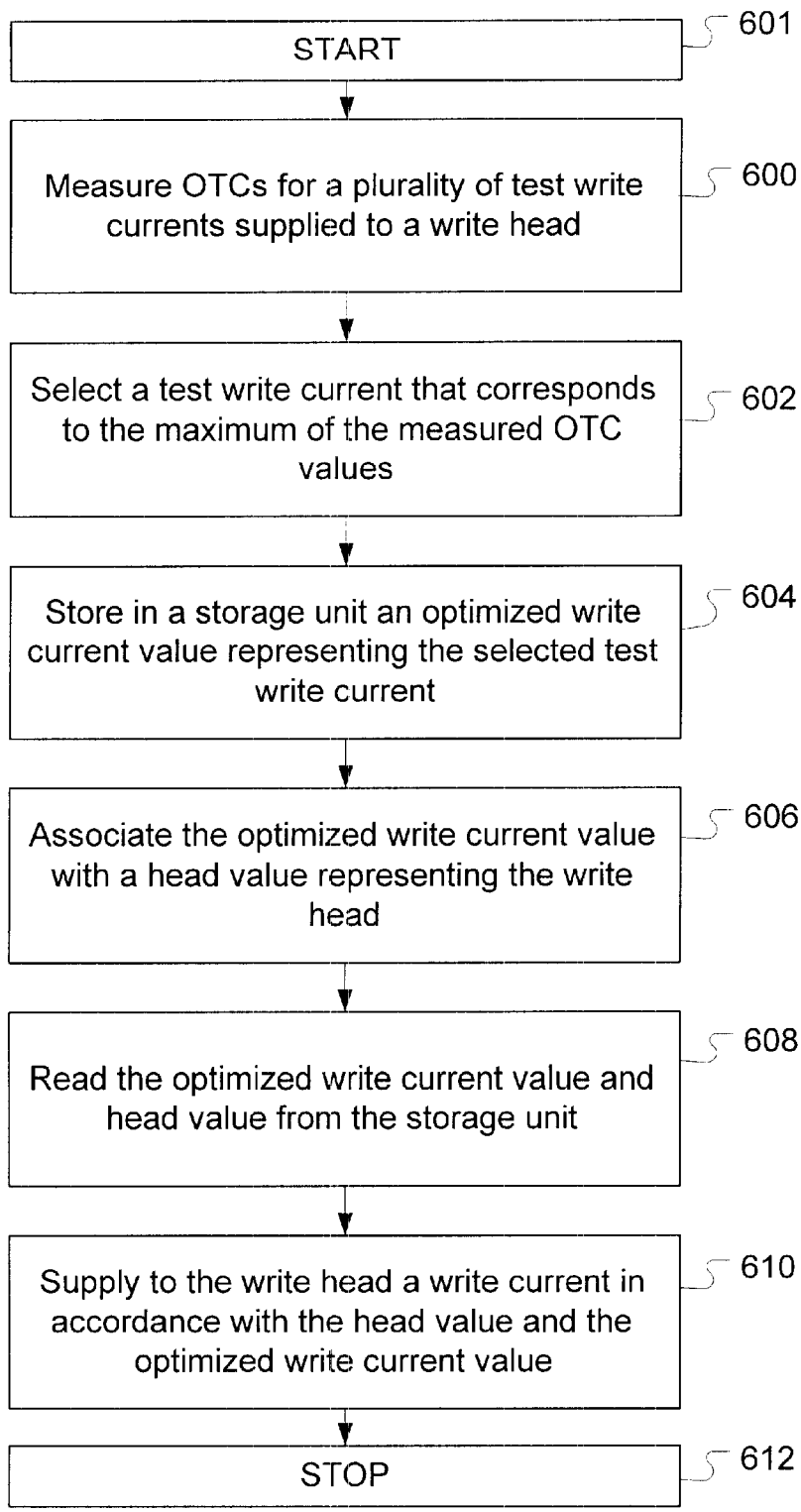
FIG. 6 depicts a flowchart of operations for optimizing a write current for a write head in a disc drive system in an embodiment of the present invention.

FIG. 6 depicts a flowchart of operations for optimizing a write current for a write head in a disc drive system in an embodiment of the present invention. Preferably, the operations are performed at a manufacturing site during certification of the disc drive system, starting at step 601. Step 600 measures the OTC for a plurality of test write currents supplied to a write head. The plurality of test write currents is defined by an array of test write current values recorded in a storage unit. Step 602 selects the test write current that corresponds to the maximum of the measured OTC values. In step 604, an optimized write current value representing the selected test write current from step 602 is stored in a storage unit. Step 606 associates the optimized write current value with a stored head value representing the write head from step 600. In a preferred embodiment, operations 600 through 606 are executed during a certification procedure by the manufacturer. In step 608, which is typically executed during a power-up procedure during normal operation of the disc drive, the optimized write current value and the head value are read from the storage unit. In step 610, a write current corresponding to the optimized write current value is supplied to the write head corresponding to the head value. In an alternative embodiment of the present invention, optimized write currents are determined on a track-by-track basis for each head in the disc drive system. Step 612 terminates the process.

Figure 7:
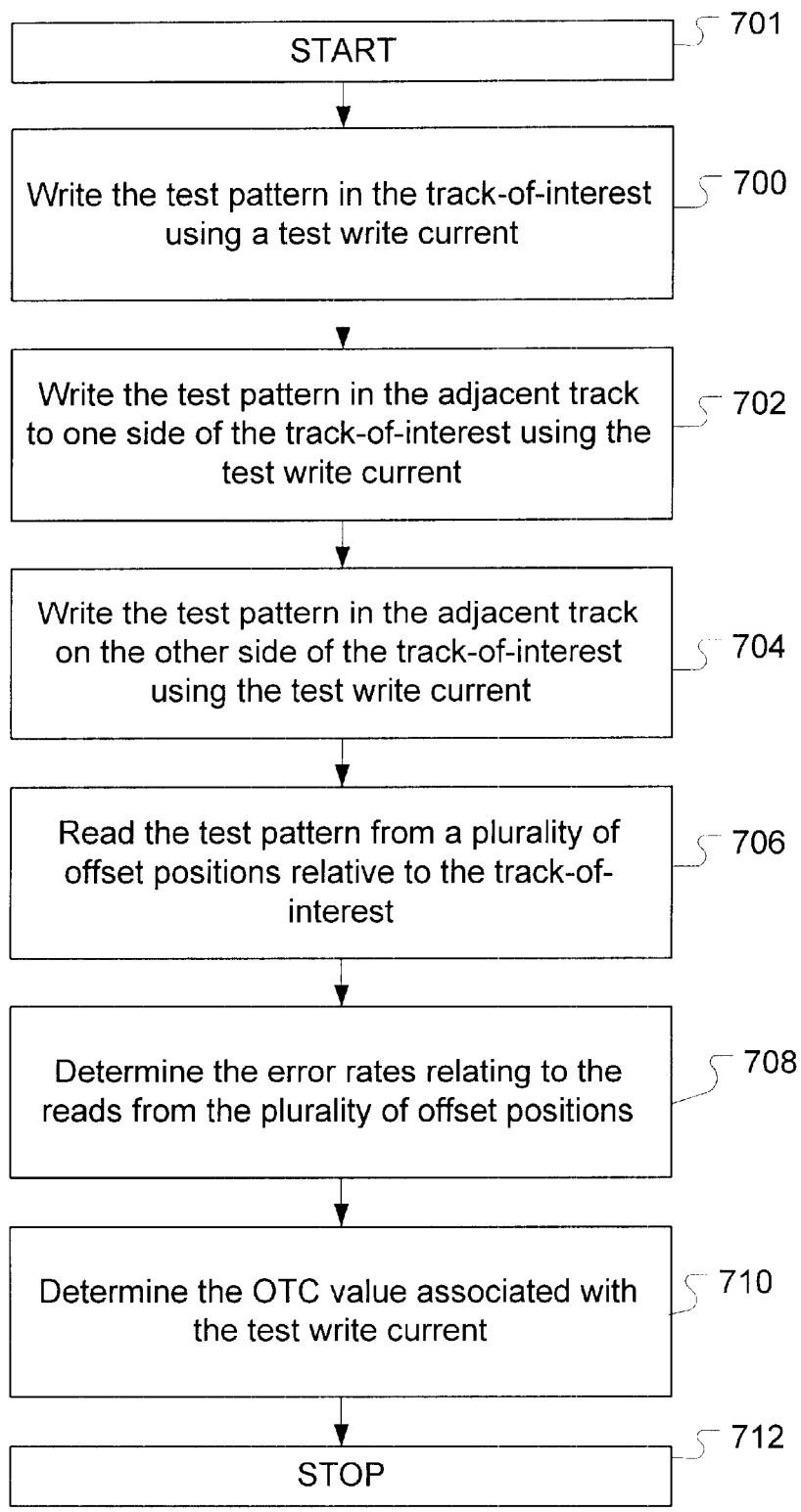
FIG. 7 depicts operations for measuring an off-track read capability for a selected test write current in an embodiment of the present invention.

FIG. 7 depicts operations for measuring an OTC for a selected test write current in an embodiment of the present invention, starting at step 701. Step 700 writes a test pattern in a track-of-interest (or a "test track") using a test write current. Generally, the test pattern includes a write pattern in a write track, and noise bands and erase bands on either of the two sides of the write track. In an embodiment of the present invention, the write pattern comprises consecutive "zero bits" recorded in the write track. To read the write pattern, a read head flies across a portion of the write track (i.e., the read track) detecting changes in the data recorded in the write track. Step 702 writes the write pattern in an adjacent track to a first side of the track-of-interest using the test write current. Step 704 writes the test pattern on the adjacent track on a second side of the track-of-interest using the test write current. For example, the step 702 writes a write track on the radially inward side of the track-of-interest, and the step 704 writes a write track on the radially outward side of the track-of-interest. In step 706, a read head reads the test pattern from a plurality of offset positions relative to the track-of-interest. In step 708, the error rates relating to the reads from the plurality of offset positions are determined. In an embodiment of the present invention, an error is detected when the read head detects a "one bit" instead of a "zero bit" that was originally written in the write pattern. The number of errors detected is determined and associated with the corresponding offset position. In step 710, the OTC value associated with the test write current is determined. Preferably, the OTC value corresponds to the number of consecutive (e.g., adjacent) read positions in which read operations yielded an acceptable number of errors (see FIG. 5).

When an OTC value cannot be determined, such as when no offset position yields an acceptable error rate, the total number of errors resulting from the reads across all offset positions is determined for each particular test write current. In such case, the step 602 of FIG. 6 is modified to select a write current that corresponds to the minimum number of total errors. In this manner, the best possible write current is selected for a particular write head, even though the error rate exceeds the acceptable error rate threshold because of other factors (such as media defects, media coercivity, media thickness, write head size, and head flying height).

Preferably, the operations in FIG. 7 are repeated for a plurality of test write currents, which are specified by test write current values stored in a storage unit. As such, the OTC values for each test write current are evaluated in step 602 of FIG. 6 to determine the maximum OTC value, which is to correspond to the optimized write current. In an alternative embodiment, when the OTC values for a plurality of consecutive write currents are substantially equal and near a maximum, an interpolation between the extremes of these consecutive write currents is calculated. In this case, the test write current closest (i.e., rounding up) to the interpolated write current is selected as the optimized current. This interpolation method provides some buffer on both sides of the optimized write current while maintaining a maximum OTC. In this manner, the maximum OTC can be maintained when environmental changes, such as changes in temperature, could otherwise affect the write track width. Step 712 terminates the process.

Figure 8:
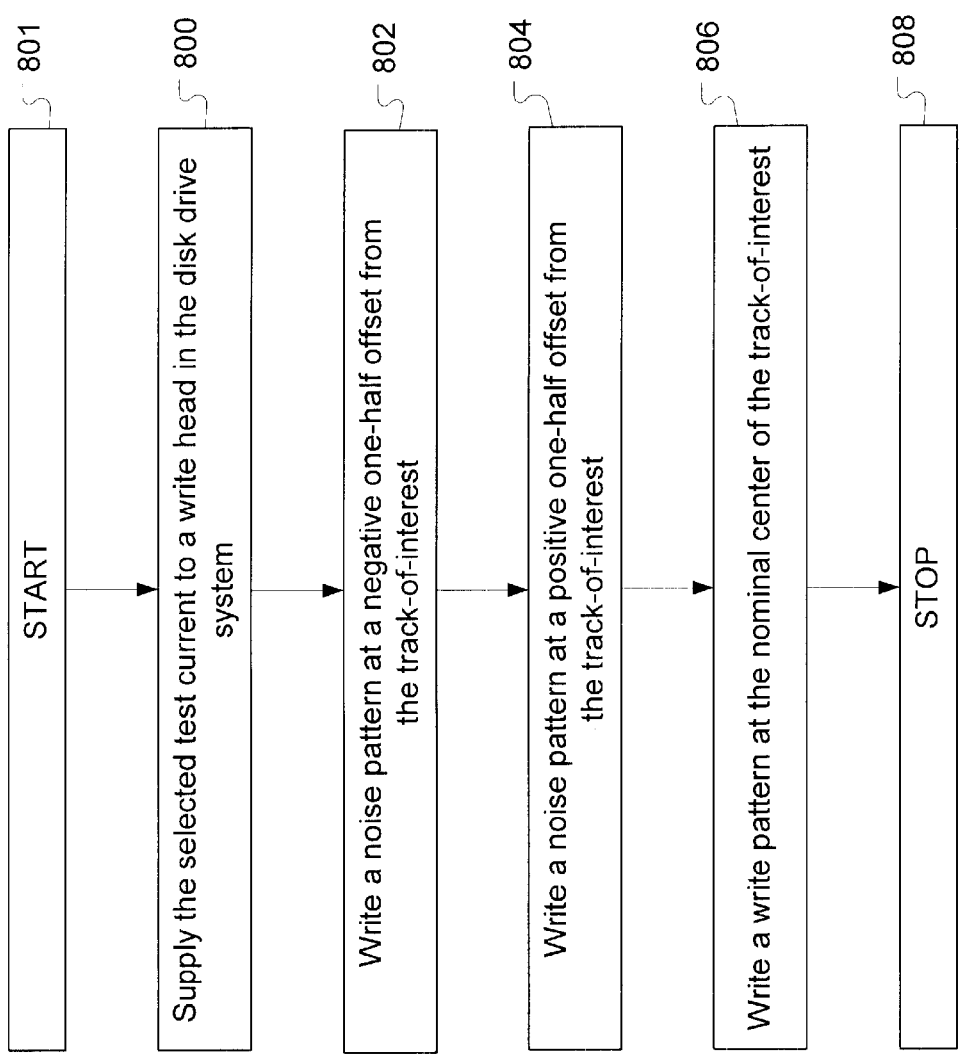
FIG. 8 depicts a flowchart of operations for writing a test pattern to a track on a magnetic disc in an embodiment of the present invention.

FIG. 8 depicts a flowchart of operations for writing a test pattern to a track on a magnetic disc in an embodiment of the present invention, starting at step 801. Step 800 supplies a selected test write current to a write head in the disc drive system. Step 802 writes a noise pattern at a negative one-half offset from the track-of-interest. In other words, a noise pattern is written to the radially inward side of the nominal center of the track-of-interest, resulting in a negative offset of one-half of the nominal track pitch. Step 804 writes a noise pattern at a positive one-half offset from the track-of-interest. In other words, a noise pattern is written to the radially outward side of the nominal center of the track-of-interest, resulting in an offset of one-half of the nominal track pitch. In step 806, the write head writes a test pattern at the nominal center of the track-of-interest, producing a write track. Step 808 terminates the process.

Figure 9:
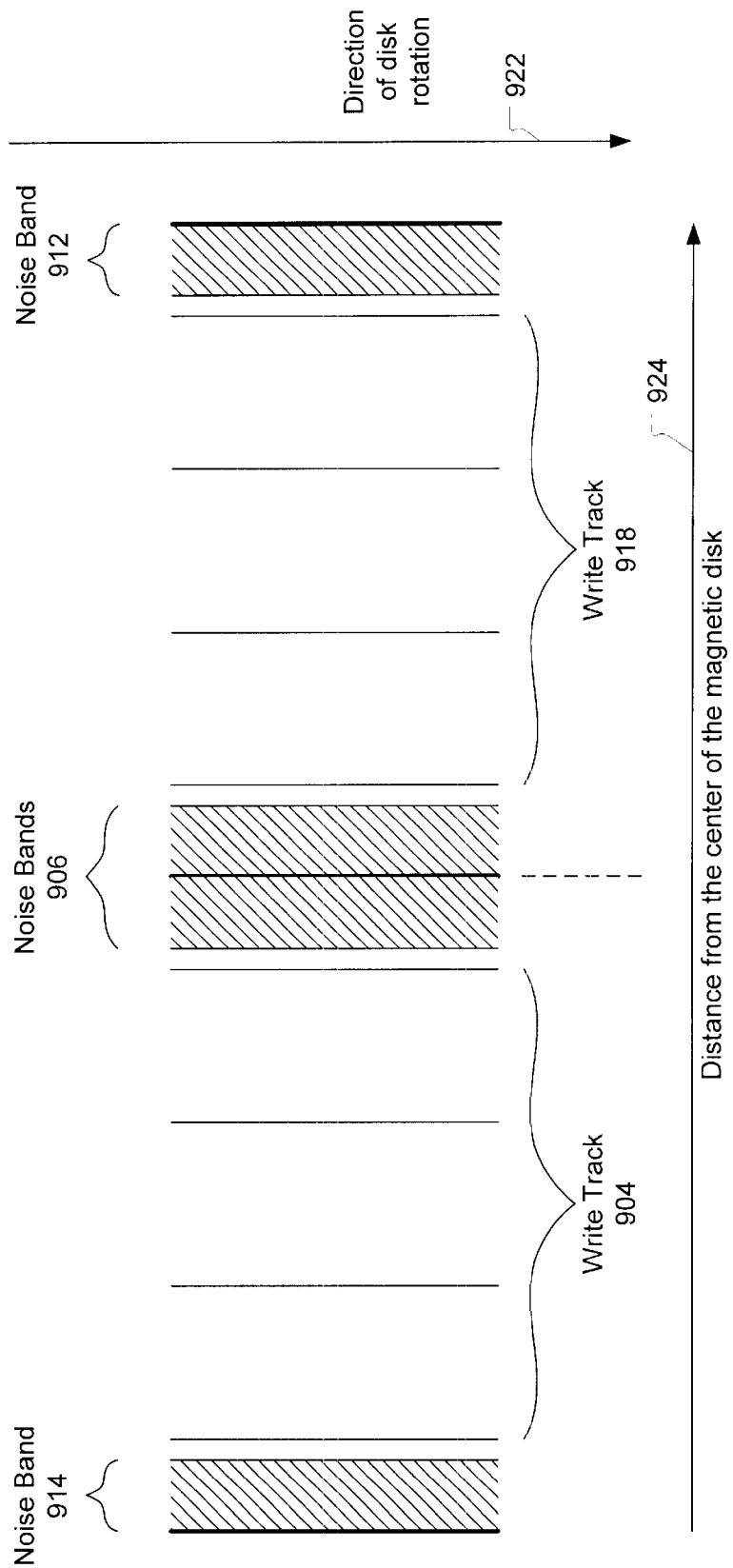
FIG. 9 illustrates two adjacent tracks of a disc drive in which the write current has been increased to exceed the write current used in the illustration of FIG. 2.

FIG. 9 illustrates two adjacent tracks of a disc drive in which the write current has been increased to exceed the write current used in the illustration of FIG. 3. Accordingly, the write track 904 and the write track 918 have increased in width, thereby reducing the wasted space occupied by the noise bands 906, 912 and 914. Arrow 922 represents the direction of disc rotation. Arrow 924 represents the distance from the center of the disc.

Figure 10:
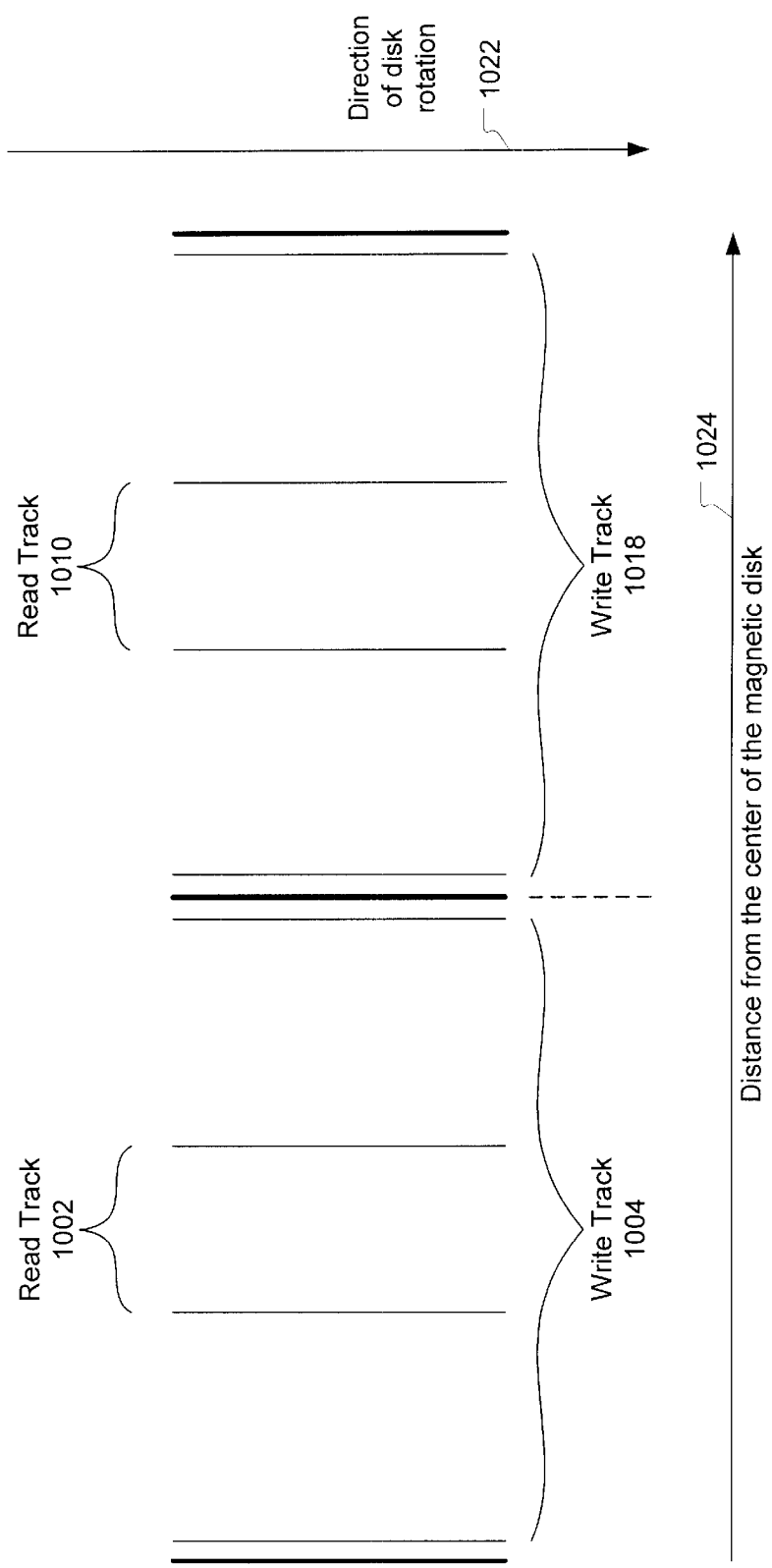
FIG. 10 illustrates two adjacent tracks of a disc drive in which write current has been optimized so as to substantially eliminate noise bands.

FIG. 10 illustrates two adjacent tracks of a disc drive in which write current has been optimized so as to substantially eliminate the noise bands. In write track 1004, the read track 1002 has the maximum amount of write track in which to drift within the confines of the fixed track pitch. That is, there is no wasted space containing noise bands, yet the write track 1004 does not encroach into the write track 1018. Ideally, the maximum OTC corresponds to a write current such as the one described for FIG. 10. In an embodiment of the present invention, discrete test write currents are used to sample OTC values to optimize the write current for a head, and the discrete current values may not have the precision to achieve the optimization of FIG. 10. In an alternative embodiment of the present invention, a disc drive system may iteratively search for the optimal current, limited only by the capabilities of the current source, rather than relying on a selection of discrete test write current values. In such an embodiment, the ideal optimized write current may be more precisely achieved.

Figure 11:
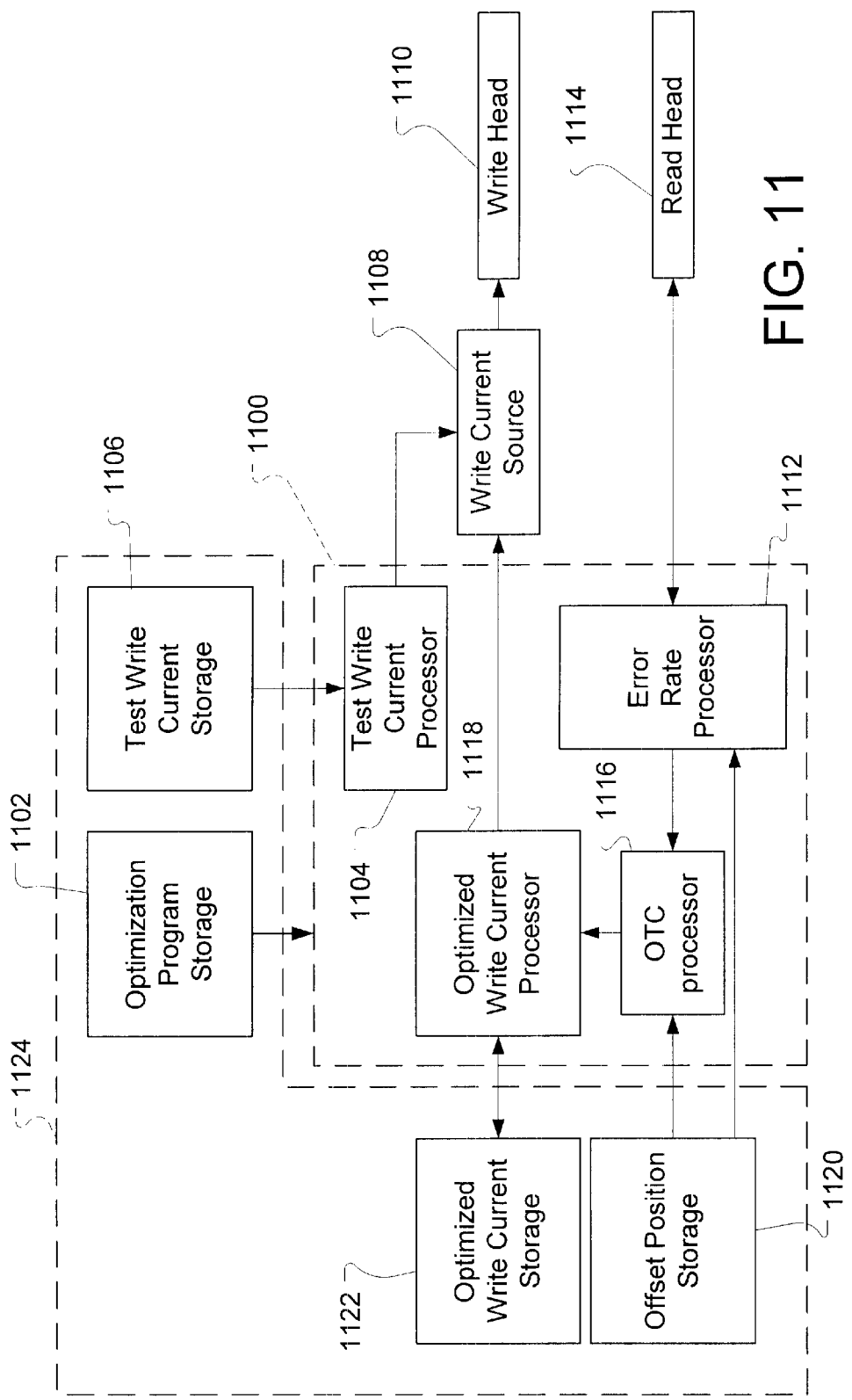
FIG. 11 depicts apparatus for optimizing a write current for a write head in a disc drive system.

FIG. 11 depicts apparatus for optimizing a write current for a write head in a disc drive system. Preferably, the apparatus of FIG. 11 resides within the disc drive, although portions of the apparatus may be reside outside the disc drive system in an alternative embodiment. A microprocessor 1100 is disposed within the disc drive system to execute program instructions for a method in accordance with the present invention. During certification, program instructions for controlling the microprocessor 1100 during the optimization process are loaded into an optimization program storage 1102. The optimization program storage 1102, as with other storage units described herein, may include without limitation random access memory (RAM), read only memory (ROM), or magnetic or optical discs. Each storage unit may simultaneously or alternately share a common storage device 1124 (e.g., all storage units in the same RAM module or bank). Alternatively, one or more storage units may comprise an individual storage device, separate from the other storage units. The microprocessor 1100 reads the program instructions from the optimization program storage 1102 to implement various processor elements of an embodiment of the present invention.

A test write current processor 1104, in accordance with program instructions read by the microprocessor 1100 from the optimization program storage 1102, reads test write current values from a test write current storage 1106 and causes write current source 1108 (i.e. a pre-amp) to supply a write head 1110 with a test write current corresponding to each value. As such, OTC is measured for a plurality of test write currents. In a preferred embodiment of the present invention, eight test write currents are used. For a 27.6 gigabyte hard disc, for example, the test currents range from 21.5 mA (milliamperes) to 45.6 mA.

An error rate processor 1112 detects the number of errors read by the read head 1114 from the track-of-interest. The error rate processor 1112 also controls the offset position of the read head based on offset position values stored in offset position storage 1120. Error rates for each offset position are passed to an OTC processor 1116 to calculate the corresponding OTC for each up position. The calculated OTC values are passed to an optimized write current processor 1118, which evaluates the OTC value for each test write current and selects the test write current corresponding to the write head 1110 and corresponding to the maximum OTC value. The optimized write current processor 1118 passes a head value corresponding to the write head and an optimized write current value corresponding to the selected test write current to an optimized write current storage 1122. During normal operation after certification, following the disc drive power-up, the optimized write current processor 1118 reads the optimized write current value and a head value from the optimized write current storage 1122 and controls the write current source 1108 (e.g., a preamp) to supply the optimized write current to the write head 1110. The processors FIG. 11 also perform equivalent functions for additional heads within the disc drive system.

In summary, a preferred embodiment disclosed herein is directed to an apparatus and method for selecting an optimized write current for a write head (such as 1110) to improve read performance from a track-of-interest (such as 200) on a storage disc (such as 116). Read error rates (such as shown relative to 506) are detected from a test pattern (such as shown in track 200) written to the track-of-interest (such as 200) using a plurality of test write currents. The read error rates (such as shown relative to 506) are detected over a range of read positions offsets (such as shown relative to 504) from the track-of-interest (such as 200). OTC values (such as 500) corresponding to each test write current are determined based on the read error rates (such as shown relative to 506) that satisfy an acceptable error rate criterion. The test write current that corresponds to the maximum OTC value (such as 500) is selected as the optimized write current. An optimized write current value corresponding to the optimized write current and a head value corresponding to the write head (such as 1110) are associatively stored in a storage unit (such as 1122), and the values are read from the storage unit (such as 1122). The optimized write current is supplied to the write head (such as 1110) in accordance to the optimized write current value.

In a preferred embodiment, a microprocessor in the disc drive system provides a test write current processor (such as 1104), an error rate processor (such as 1112), an off-track capability processor (such as 1116), and an optimized write current processor (such as 1118) in accordance with program instructions read from a storage unit (such as 1102). The test write current processor (such as 1104) writes a test pattern (such as in 200) to a track-of-interest (such as 200) for a plurality of test write currents. The error rate processor (such as 1112) determines read error rates (such as shown by 506) from a plurality of read positions (such as shown by 504) relative to the track-of-interest (such as 200). The off-track capability processor (such as 1116) calculates OTC values (such as 500) for each test write current from the error rates provided by the error rate processor (such as 1112). The optimized write current processor (such as 1118) selects the write current corresponding to the maximum OTC and loads a value for the optimized write current in a storage unit (such as 1122) in association with a write head value.

The above specification, examples and data provide a complete description of the manufacture and use of the composition of the invention. It will be clear that the present invention is well adapted to attain the ends and the advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for selecting an optimized write current for a write head to improve read performance from a track-of-interest on a storage disc, the method comprising steps of:
   (a) measuring a plurality of error rates associated with a plurality of test write currents wherein the error rates are associated with a plurality of read positions offset relative to a nominal center of the track-of-interest on each side of the nominal center at each of the test write currents to determine a plurality of off-track read capabilities for each of the plurality of test write currents; and
   (b) selecting one of the test write currents based on the off-track read capabilities to provide the optimized write current.

2. The method of claim 1 wherein the measuring step (a) comprises the steps of:
   (a)(i) writing test patterns in the track-of-interest using the plurality of test write currents;
   (a)(ii) reading each of the test patterns in the track-of-interest from the plurality of read positions; and (a)(iii) determining the error rates associated with reading the test patterns from the plurality of read positions.

3. The method of claim 2 wherein the determining step (a)(iii) comprises counting the read positions associated with an acceptable error rate for each test write current to determine a plurality of off-track read capabilities.

4. The method of claim 3 wherein the determining step (a)(iii) further comprises the step of counting only the read positions that are consecutive across the track-of-interest.

5. The method of claim 2 wherein the writing step (a)(i) comprises the steps of:
   (a)(i)(1) writing a noise pattern to the track-of-interest via the write head;
   (a)(i)(2) writing write patterns to the track-of-interest using the plurality of test write currents;
   (a)(i)(3) writing a first adjacent track on a first side of the track-of-interest using the plurality of test write currents; and
   (a)(i)(4) writing a second adjacent track on a second side of the track-of-interest using the plurality of test write currents.

6. The method of claim 2 wherein the writing step (a)(i) comprises the steps of:
   (a)(i)(1) writing a first noise pattern at a negative one-half offset from the track-of-interest; and
   (a)(i)(2) writing a second noise pattern at a positive one-half offset from the track-of-interest;
   (a)(i)(3) writing write patterns to the track-of-interest using the plurality of test write currents;
   (a)(i)(4) writing a first adjacent track on a first side of the track-of-interest using the plurality of test write currents; and
   (a)(i)(5) writing a second adjacent track on a second side of the track-of-interest using the plurality of test write currents.

7. The method of claim 1 wherein the selecting step (b) comprises the step of selecting one of the test write currents associated with a maximum of the off-track read capabilities to provide the optimized write current.

8. The method of claim 1 wherein the selecting step (b) comprises the step of selecting one of the test write currents that corresponds to an interpolated write current relative to extremes of a plurality of maximums of the off-track read capabilities.

9. The method of claim 1 further comprising a step of (c) supplying the optimized write current to the write head for writing data to the track-of-interest.

10. The method of claim 1 further comprising the steps of:
    (c) storing in a storage unit a head value corresponding to the write head; and
    (d) storing in the storage unit an optimized write current value corresponding to the optimized write current; and
    (e) associating the optimized write current value with the head value.

11. The method of claim 10 further comprising the steps of:
    (f) reading the head value and the optimized current write value from the storage unit; and (g) supplying the optimized write current to the write head, in accordance with the head value and the optimized write current value.

12. The method of claim 1 further comprising the step of:
    (c) selecting as the optimized write current one of the test write currents that corresponds to a minimum of total read errors for each of the test write currents to provide an optimized write current, if no test write current yields an acceptable error rate.

13. The method of claim 1 further comprising the steps of:
    (c) determining a second optimized write current for the write head on a different track; and
    (d) supplying the second optimized write current for the write head when writing to the different track.

14. An apparatus for selecting an optimized write current for a write head to improve read performance from a track-of-interest on a storage disc, the apparatus comprising:
    an off-track read capability processor that measures off-track read capabilities associated with a plurality of test write currents supplied to the write head;
    an optimized write current storage unit that associatively stores an optimized write current value corresponding to the optimized write current and a head value representing the write head;
    an optimized write current processor that stores to the optimized write current storage unit the optimized write current value representing one of the test write currents based on the off-track read capabilities; and
    an error rate processor configured to pass error rates to the off-track read capability processor for determining error rates associated with reads performed from a plurality of read positions offset relative to and on both sides of a nominal center of the track-of-interest at each test write current.

15. The apparatus of claim 14 further comprising:
    a test write current storage unit for storing test current values corresponding to the test write currents;
    a test write current processor for selecting the test current values from the test write current storage unit; and
    a write current source responsive to the test current values selected by the test write current processor for supplying the test write currents to the write head.

16. A disc drive system for selecting an optimized write current to improve read performance from a track-of-interest on a storage disc, the disc drive system comprising the apparatus of claim 14.

17. A disc drive system for selecting an optimized write current to improve read performance from a track-of-interest on a storage disc, the disc drive system comprising:
    a write head for writing data to the track-of-interest on the storage disc; and
    means for selecting the optimized write current by measuring a plurality of error rates associated with a plurality of read positions offset relative to and on both sides of a nominal center of the track-of-interest for each of a plurality of test write currents.

* * * * *